INVENTORS
ANTHONY V. CAMINO
WALTER H. HOGAN
BY
*John E. Reufer*
ATTORNEY

July 5, 1960 A. V. CAMINO ET AL 2,943,818
STEERING MECHANISM
Filed March 15, 1956 4 Sheets-Sheet 2

INVENTORS
ANTHONY V. CAMINO
BY WALTER H. HOGAN

ATTORNEY

July 5, 1960     A. V. CAMINO ET AL     2,943,818
STEERING MECHANISM

Filed March 15, 1956                           4 Sheets—Sheet 3

INVENTORS
ANTHONY V. CAMINO
BY WALTER H. HOGAN

ATTORNEY

July 5, 1960     A. V. CAMINO ET AL     2,943,818
STEERING MECHANISM

Filed March 15, 1956     4 Sheets-Sheet 4

INVENTORS
ANTHONY V. CAMINO
BY WALTER H. HOGAN

ATTORNEY

United States Patent Office 2,943,818
Patented July 5, 1960

2,943,818
STEERING MECHANISM

Anthony V. Camino, Cleveland, and Walter H. Hogan, Olmstead Falls, Ohio, assignors to Cleveland Pneumatic Industries, Inc., a corporation of Ohio Filed Mar. 15, 1956, Ser. No. 571,842

6 Claims. (Cl. 244—50)

This invention relates to steering mechanisms and more particularly to a steering mechanism adapted for use in the ground steering of aircraft and the like.

It is an important object of this invention to provide a steering mechanism capable of steering through essentially any desired steering angle.

It is another important object of this invention to provide a steering mechanism which will supply constant torque through the entire range of steering.

It is still another object of this invention to provide a steering mechanism for use in aircraft which will provide vibration damping forces which are not affected by the angle of steering.

It is still another object of this invention to provide a steering mechanism which permits full swiveling without disconnecting any of the linkage.

It is still another object of this invention to provide a steering mechanism which eliminates the necessity of any swivel hydraulic connections and permits the use of rigid couplings.

It is still another object of this invention to provide a steering mechanism for aircraft which can be closed to prevent entry of dirt, grime or any other foreign matter.

Further objects and advantages will appear from the following description and drawings, wherein.

In modern aircraft the power steering mechanism must be capable of turning the steerable wheel through the full range of steering when the airplane is stationary. This is the most severe torque requirement of the steering mechanism since the rubber of the tire scuffs on the ground under these conditions. In prior art steering mechanisms the torque efficiency of the landing gear reduces as the landing gear is turned away from the neutral position wherein the wheel is aligned with the major axis of the aircraft. Since the steering mechanism must be capable of providing sufficient torque to turn the landing gear in the extremes of the steering range, this has been the condition which usually determines the sizing of the steering motor. The steering motor according to this invention is capable of producing constant torque throughout the entire steering range so a smaller more efficient mechanism results and it is not necessary to provide a motor which has a large surplus of torque producing power in the neutral position.

It is also sometimes necessary, and almost always desirable, to provide full swiveling of the landing gear through 360° wherein the swiveling is accomplished by an external power source such as a tractor or the like. This feature is particularly desirable on shipboard aircraft where it is necessary to maneuver the aircraft in very confined quarters. A structure according to this invention permits the full swiveling of the landing gear without any disconnect mechanism. If the occasion should arise the steering mechanism could be used to power the landing gear for steering through a full 360° steering range.

Figure 1:
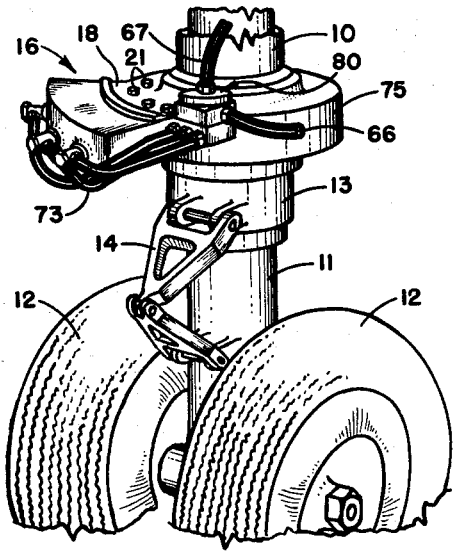
Figure 1 is a fragmentary perspective view of the preferred steering mechanism according to this invention installed in a typical landing gear.

Referring to the drawings, Figure 1 shows a conventional landing gear structure with the preferred steering mechanism installed thereon. The landing gear includes an upper telescoping member 10 adapted to be mounted on the frame of the aircraft and a lower telescoping member 11 on which are journaled ground engaging wheels 12. The upper telescoping member 10 is fixed against rotation by its mounting on the frame of the aircraft and the lower telescoping member 11 is arranged to permit free rotation relative to the upper telescoping member 10. A steering collar 13 is mounted on the upper telescoping member 10 for rotation relative thereto and is connected to the lower telescoping member 11 by torque arms 14 which prevent relative rotation between the steering collar 13 and the lower telescoping member 11 while permitting relative axial motion therebetween. Suitable spring and damping means should be provided between the two telescoping members to absorb the impact shock of landing and also resiliently support the weight of the aircraft when it is on the ground. A preferred steering motor 16 is fixed to the upper telescoping member 10 and is adapted to rotate the steering collar 13 in a controlled manner and thereby steer the wheels 12.

Figure 2:
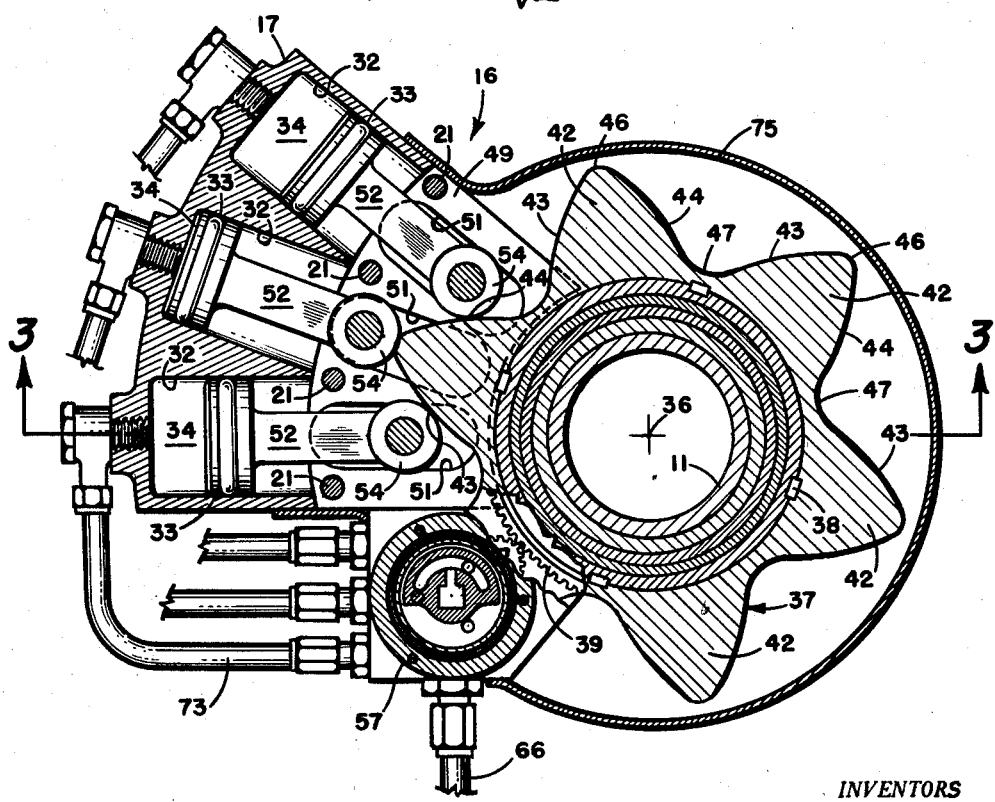
Figure 2 is an enlarged cross section showing the structural detail of the steering mechanism per se.
Figure 3:
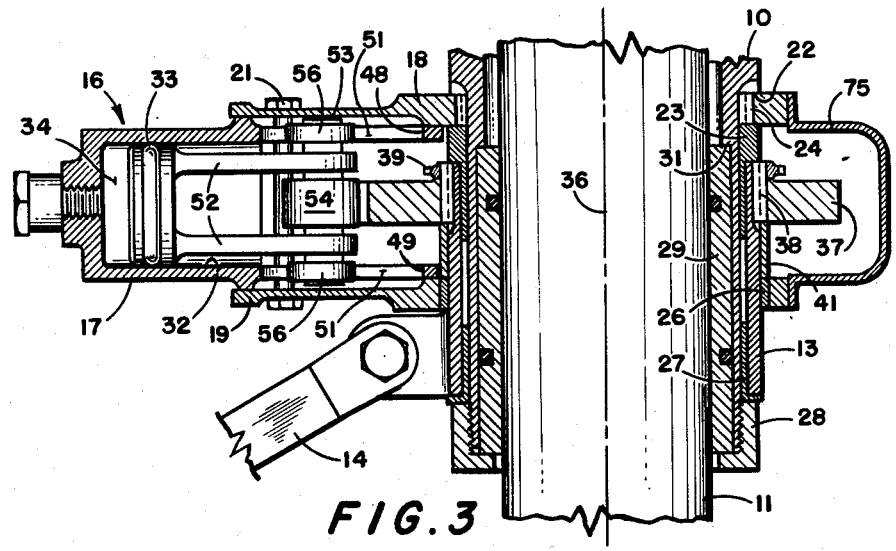
Figure 3 is a longitudinal section taken along 3—3 of Figure 2.
Figures 4, 5:
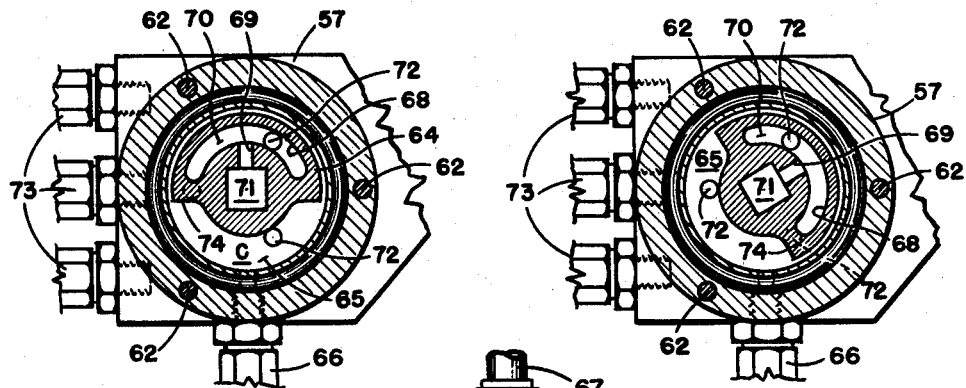
Figures 4 and 5 are enlarged cross sections showing the structure and operation of the preferred distributor valve.
Figure 6:
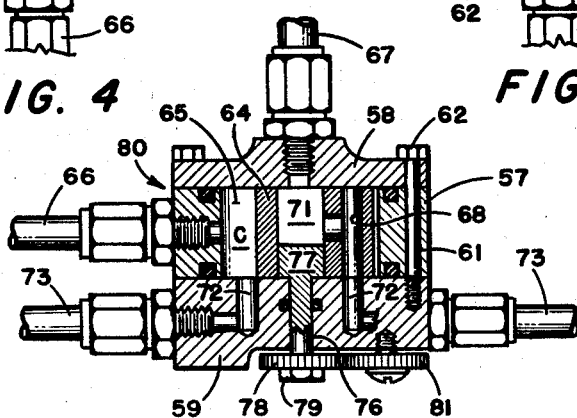
Figure 6 is a composite longitudinal section of the distributor valve with some of the elements rotated into the plane of section in order to provide a clear understanding of the valve operation; and, Figures 7a through 7f are progressive schematic illustrations showing the operation of the steering motor.

Referring to Figures 2 and 3, the steering motor 16 includes a cylinder block 17 which is bolted between an upper cover plate 18 and a lower cover plate 19 by bolt fasteners 21. The upper cover plate 18 is axially fixed to the upper telescoping member 10 between a shoulder 22 and a bearing member 23 and is rotationally fixed by a key 24. The lower cover plate 19 is radially supported on the steering collar 13 by a bearing 26 and the steering collar 13 is in turn radially supported on the upper telescoping member 10 by the bearing 23 and a bearing 27. A gland nut 28 is threaded onto the upper telescoping member 10 and serves the dual function of axially positioning the bearing 27 and therethrough the steering collar 13 as well as securing a gland member 29 against a shoulder 31 formed in the upper telescoping member 10. The gland member 29 provides lateral support between the upper and lower telescoping members 10 and 11 while permitting axial motion therebetween. The cylinder block 17 is formed with a plurality of cylinder bores 32 which are adapted to receive cooperating sliding pistons 33. Each of the cylinder bores 32 and the corresponding piston 33 cooperate to define a cylinder chamber 34 which is adapted to receive pressure fluid which produces an axial force urging corresponding piston 33 along its axis toward the central axis 36 of the landing gear.

A cam 37 is rotationally fixed relative to the steering collar 13 by a plurality of keys 38 and is axially fixed relative thereto between a spacer 41 and a ring gear 39 which in turn is positioned against the bearing 23. The cam 37 is formed with a plurality of similar lobes 42 which are symmetrically arranged around the cam. In the particular structure shown, there are six lobes 42 formed on the cam 37. However, the requirements of the particular installation are controlling in the choosing of the number of lobes as will be discussed in detail later.

Each of the lobes provides a first radially extending ramp surfaces 43 and a second opposed radially extending ramp surface 44 which are connected at the outer end of the lobe by an outer transition convex surface 46. Each of the ramp surfaces is also joined to the adjacent ramp surface of the adjacent lobe by an inner transition concave surface 47.

The cylinder block 17 is formed with an upper skirt 48 and a lower skirt 49 which extend inwardly to a position adjacent to the steering collar 13 on either side of the cam 37. The two skirt portions 48 and 49 are each formed with radially extending slots 51 best seen in Figures 2 and 3. Each of the pistons 33 is provided with yoke projections 52 which extend from the piston in a direction toward the cam 37. The projections 52 are proportioned so that they cooperate to form a fork which supports a cross shaft 53. A cam follower 54 is mounted on the cross shaft 53 between the projections 52 for engagement with the camming surfaces. Lateral thrust bearings 56 mounted on either end of the cross shaft 53 are positioned within the slots 51 so that any lateral force applied to the cross shaft 53 by the cam follower 54 is absorbed by the walls of the slots 51. Therefore, as the pistons 33 move axially back and forth within their corresponding cylinder bores 32, no lateral forces are transmitted to the pistons which could cause wear or seal problems.

The cam followers 54 engage the cam 37 at circumferentially spaced points along the camming surface. Since there are six lobes on the cam shown in the drawings, the lobes are circumferentially spaced from each other by 60°. Also since there are three cylinder bores 32, pistons 33 and cam followers 54 the various proportions should be arranged so that the cam followers are circumferentially spaced from each other by an angle of 20° which is one-third of the angle between the lobes 42. The inclined ramp surfaces 43 and 44 are formed so that they each extend around the cam through an angle substantially equal to 20° and so that the outer and inner transition surfaces 46 and 47 combine to extend through 20°. Therefore, at all times one of the cam followers will engage one of the inclined ramp surfaces 43 and another cam follower will engage one of the ramp surfaces 44. By utilizing this arrangement it is possible to provide steering torque in either direction at any time. Whenever pressure fluid is supplied to the cylinder chamber 34 corresponding to the cam follower which is engaging one of the inclined ramp surfaces 43 the cam follower will press against the inclined ramp surfaces 43 and produce a torque which rotates the cam 37 and in turn the steering collar 13 in a clockwise direction. Conversely, if pressure fluid is supplied to the cylinder chamber 34 corresponding to the cam follower 54 which is engaging one of the inclined ramp surfaces 44, a torque will be applied which tends to rotate the cam 37 and in turn the steering collar 13 in a counterclockwise direction. The ramp surfaces 43 and 44 should be formed so that a given unit of angular rotation of the cam 37 will produce a given amount of piston travel regardless of the point of engagement between the ramp surfaces and cam followers 54. If this is done a constant torque mechanism results.

A distributor valve assembly 80 is connected between the cylinder chambers 34 and a source of pressure fluid in order to provide the successive pressurizing of the cylinder chambers 34. The distributor valve is provided with an upper end plate 58 and a lower end plate 59 which are positioned opposite sides of a spacer 57. These three elements are bolted together by bolt fasteners 62 and cooperate to form a valve cavity C in which is positioned a valve rotor 64. The valve rotor 64 is provided with an arcuate slot 68 in communication with a central rectangular opening 71 through a radial port 69. A first pressure fluid line 66 is connected to the chamber C around the valve rotor and a second pressure fluid line 67 is connected to the rectangular opening 71 in the valve rotor 64. Therefore, a first zone 65 around the valve rotor is in communication with the first pressure line 66 and a second zone 70 within the slot 68 in the rotor is in communication with the second pressure line 67. The two zones 65 and 70 are isolated from each other by a sealing engagement between the ends of the valve rotor and the faces of the end plates 58 and 59. The lower end plate 59 is formed with 3 symmetrically spaced ports 72, one of which is connected to each of the cylinder chambers 34 through separate pressure lines 73. The ports 72 are spaced from the central axis of the valve so that they open into the zone 70 as the slot 68 rotates into registration with them or are open to the zone 65 as the case may be. The valve rotor 64 is formed with lands 74 which have a width only slightly larger than the diameter of the ports 72 so that the ports are either in fluid communication with the zone 65 or the zone 70 excepting in the special case where the individual port is being valved from one zone to the other.

A valve shaft 76 projects through the lower end plate 59 and is formed with a rectangular end portion 77 which fits into the central rectangular opening 71 in the valve rotor 64 so that rotation of the valve shaft 76 causes rotation of the rotor. A gear 78 is mounted at the lower end of the valve shaft 76 by means of a nut fastener 79 and intermeshes with an idler gear 81 which in turn intermeshes with a ring gear 39 fixed on the steering collar 13. Thus, as the cam 37 and steering collar 13 rotate, the valve rotor 64 rotates in a synchronized manner. The gearing must be arranged so that the valve rotor 64 rotates with an angular velocity six times the angular velocity of the cam 37 because there are six lobes on the cam. Therefore, the distributor valve will return to its initial position each time the cam followers 54 return to an initial relationship on a lobe so that the proper cylinder chambers will always be connected to the source of pressure fluid or reservoir return as the case may be.

Figure 7A:
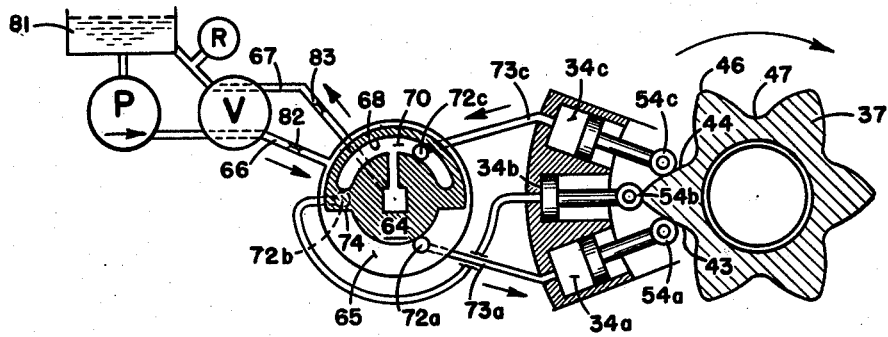

Reference should now be made to Figures 7a through 7f which schematically show progressive positions through which the mechanism passes during the operation of the steering motor wherein the letter designation a, b and c will be used to distinguish between individual cylinders and parts corresponding therewith. In each of these figures a reservoir 81, a pump P used to provide the pressure for the actuation of the motor and a control valve V are schematically shown. The arrows on the figures indicate the direction of rotation and of fluid flow. In Figure 7a the various elements are in the position shown in Figure 2. If the cam 37 is to be rotated in a clockwise direction pressure fluid is supplied to the first pressure line 66 by connecting this line to the pressure side of pump P through the valve V. The pressure line 67 is also connected to the reservoir 81 through the valve V so that the zone 70 is connected to the reservoir return and the zone 65 is connected to the source of pressure fluid, namely the pump. Because the port 72a is in communication with the zone 65 the cylinder chamber 34a is also in communication with the pump P. The port 72c is in communication with the reservoir 81 so the cylinder chamber 34c is also in communication with the reservoir. At the instant shown in Figure 7a, the cylinder chamber 34b is isolated from both the reservoir 81 and the pump P because the land 74 covers the port 72b. Since the cam follower 54a is in contact with one of the first inclined ramp surfaces 43 a force is produced on the cam 37 which rotates it in a clockwise direction. The cam follower 54c being in engagement with one of the second inclined ramp surfaces 44 will be cammed radially to the left as the cam 37 rotates in a clockwise direction causing the fluid within the cylinder chamber 34c to flow to the reservoir return. Because the valve rotor 64 is geared to the cam 37 for rotation in the same direction as the cam the port 72b is brought into communication with the zone 65 and in turn the pump as soon as the steering mechanism rotates from the position of Figure 7a.

Figure 7B:
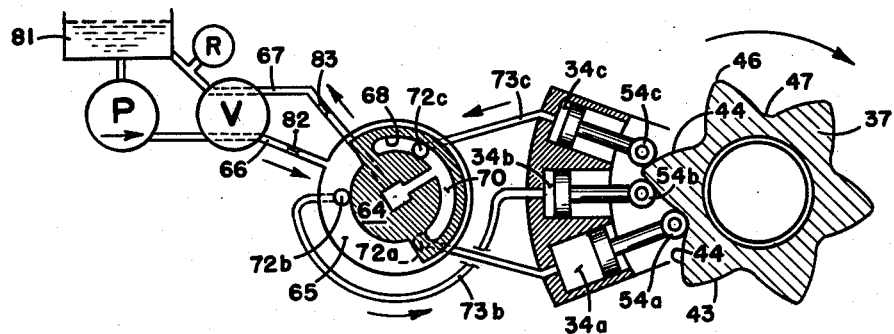
Figure 7C:
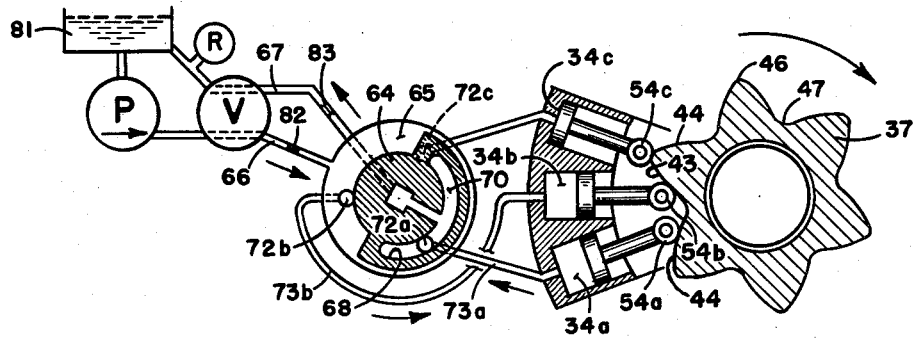
Figure 7D:
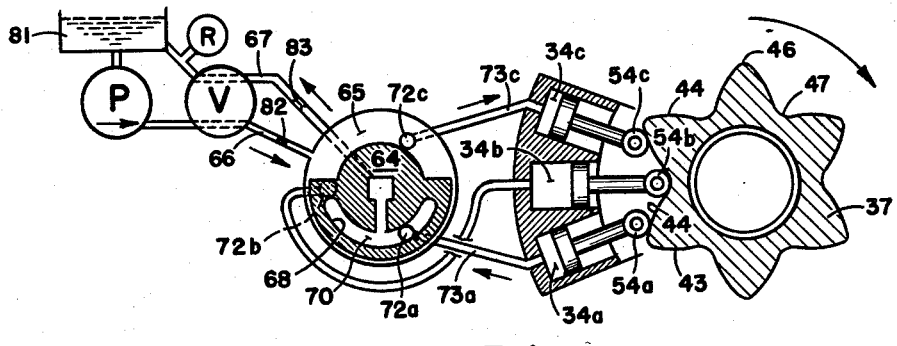

As rotation continues the elements assume the position of Figure 7b at which time the cam follower 54a engages one of the inner transition surfaces 47 and the cam follower 54b engages one of the inclined ramp surfaces 43. The cam follower 54c is still in engagement with one of the ramp surfaces 44 so additional movement in a clockwise direction will bring it into contact with one of the transition surfaces 46. During the rotation to the position shown in Figure 7b the valve rotor 64 has rotated to the position wherein the port 72b is in communication with the zone 65, the port 72c is in communication with the zone 70 within the slot 68 and the port 72a is isolated from both zones by the land 74. Therefore, the cylinder chamber 34c is in communication with the reservoir 81, the cylinder 34b is in communication with the pump P and the cylinder 34a is isolated from both the pump P and the reservoir 81. Since pressure fluid is supplied to the cylinder chamber 34b a force will be developed on the cam 37 causing it to continue to rotate in a clockwise direction and fluid will be pumped out of the cylinder chamber 34c to the reservoir 81 due to the piston movement caused by the engagement of the cam follower 54c and one of the ramp surfaces 44. The fact that the cylinder chamber 34a is momentarily isolated from both the reservoir and the pump will not cause difficulty because the piston and cam follower are in their dead center position at this time so the piston is momentarily stationary.

Figure 7E:
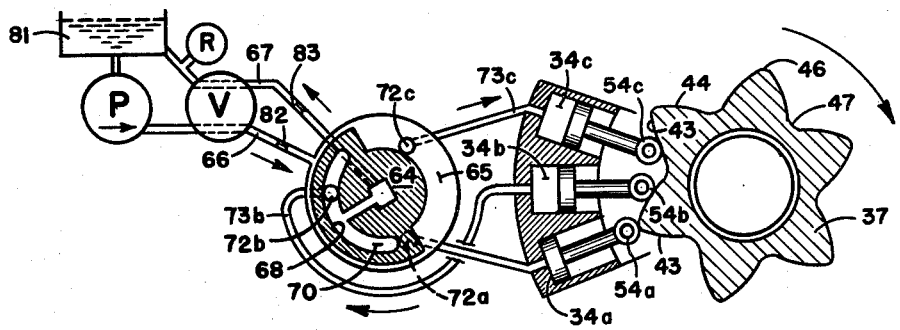
Figure 7F:
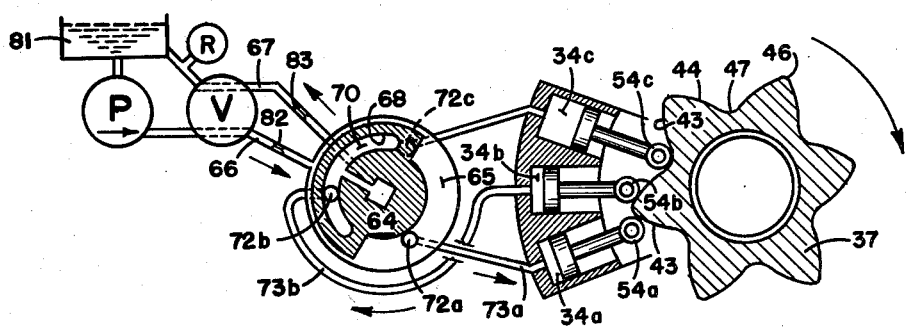

As soon as the elements move from the position of Figure 7b the cylinder chamber 34a is brought into communication with the reservoir 81 through the zone 70 within the slot 68. As rotation in a clockwise direction continues the elements assume the position shown in Figure 7c at which time the cam follower 54c is in engagement with one of the outer transition surfaces 46 and the cam followers 54b and 54a are in engagement with the ramp surfaces 43 and 44 respectively. Because the valve rotor 64 has rotated with the cam 37 the port 72a is now in communication with the reservoir 81 but the port 72b remains in communication with the pump P. Since the port 72b is still in communication with the pump the cylinder chamber 34b is still pressurized the cam 37 will continue to rotate in a clockwise direction. However, movement of the piston associated with the cylinder chamber 34a caused by engagement of the cam follower 54a with the ramp surface 44 caused fluid contained within the chamber to be pumped to the reservoir 81. When the elements reach the position of Figure 7d the cam follower 54b is in engagement with one of the inner transition surfaces 47 and the port 72b is isolated from both the pump P and reservoir 81. In this position however the cam follower 54c is in engagement with one of the ramp surfaces 43 and the cylinder chamber 34c is in fluid communication with pump P. Of course the cam follower 54a engages one of the ramp surfaces 44 and the cylinder chamber 34a is in fluid communication with the reservoir 81. A clockwise rotation of the cam 37 and valve rotor 64 continues until the position of Figure 7e is reached at which time the cam follower 54a engages one of the outer transition surfaces 46 and the cam followers 54c and 54b engage the ramp surfaces 43 and 44 respectively. The distributor valve also provides communication between the pump P and the cylinder chamber 34c and between the reservoir 81 and the cylinder chamber 34b so clockwise rotation continues until the position of Figure 7f is reached. At this time the cam follower 54c engages one of the inner transition surfaces 47 while the cam followers 54a and 54b engage ramp surfaces 43 and 44 respectively. From the position of Figure 7f the elements continue to the position shown in Figure 7a excepting that the cam followers 54 are in engagement with the adjacent lobe of the cam 37.

As the cam 37 rotates through one-sixth of a revolution the valve rotor 64 rotates through a full revolution. At all times one of the cam followers 54 is in engagement with one of the ramp surfaces 43 and another of the cam followers 54 is in engagement with one of the ramp surfaces 44. Also, the distributor valve always connects the cylinder chamber 34 associated with the follower 54 engaging one of the ramp surfaces 43 to the pressure line 66 and the chamber 34 associated with the cam follower engaging the ramp surface 44 to the pressure line 67. Therefore, if the connection of the pressure line 66 and 67 is reversed by the valve V so that the pressure line 67 is connected to the pump P and the pressure line 66 is connected to the reservoir 81 rotation in a counter clockwise direction will result. A valve which is suitable for use as the control valve V is shown in the copending application of Walter H. Hogan, Serial No. 489,987, filed February 23, 1955.

In the preferred embodiment a pressure sensitive relief valve R should be provided between the valve V and the reservoir 81 to maintain a back pressure in the line connecting the valve V to the reservoir 81 so that the cylinder chamber 34 connected to the reservoir 81 will always be under a back pressure. This will produce a positive force between the cam follower 54 associated with the cylinder chamber 34 which is connected to the reservoir 81 so that back lash or free play is automatically taken up. In one preferred embodiment the source of pressure fluid is at a pressure of approximately 3,000 lbs. per sq. in. and the reservoir return is maintained at a pressure of approximately 300 lbs. per sq. in. Therefore, a differential pressure of 2700 lbs. per sq. in. is available to produce steering torque.

The valve V should also be arranged so that when power steering is not required the two pressure lines 66 and 67 are connected together. Preferably flow restrictions of the orifice type 82 and 83 are provided in the pressure lines 66 and 67. These flow restrictions or orifices should be proportioned so that they do not create a substantial pressure drop to the quantity hydraulic flow present in steering. However, since the rotational velocities which occur during shimmying of the wheels 12 are much greater than the velocities which occur during steering these orifices 82 and 83 present a substantial restriction to fluid flow through the pressure lines 66 and 67 respectively and therefrom dampen any shimmy motion.

When the steering mechanism is used for shimmy damping the two pressure lines 66 and 67 are connected together by the valve V and the wheels tend to turn in a clockwise direction under shimmy conditions the cam 37 is turned in the same direction. This causes the piston 33 associated with the cam follower engaging one of the ramp surfaces 44 to move to the left. This causes fluid to be pumped from the corresponding chamber 34 through the distributor valve 80, the pressure line 67, valve V, pressure line 66 and back to the cylinder chamber 34 associated with the cam follower 54 engaging one of the ramp surfaces 43. Because the ramp surfaces 43 and 44 are designed to give constant torque for steering the two pistons 33 associated with the cam followers engaging the ramp surfaces move with equal velocity but in opposite directions. Therefore, fluid pumped from one chamber 34 flows to the other through the orifices 82 and 83 which resist this flow and therefore resist the motion of the cam 37 wheels 12. When the shimmy is in the opposite direction the fluid flows between the same chambers 34 in the opposite direction and the orifices 82 and 83 again cause a resistance to the motion.

A plate 75 may be mounted on the cover members 18 and 19 around the cam to totally enclose the steering motor and prevent dirt or other foreign matter from entering the mechanism. This permits the use of the simple piston and cylinder structure without wiper, gland or the like.

In the illustrated embodiment there are three cylinders and six cam lobes however, it should be understood that an optimum design for a particular installation might require more cylinders, a different number of cam lobes or a different height of cam lobe. If necessary the cylinders may be circumferentially spaced so that they engage spaced ramp surfaces on the cam rather than an adjacent ramp as shown in the drawing. It is important however, to arrange the proportions so that the cam followers always engage opposed ramp surfaces so that torque in either direction can be provided from any position. For instance if five cylinders were used two cam followers would engage the first inclined surfaces 43, two would engage the second inclined surfaces 44 and the remaining one would engage one of the transition surfaces.

Because the inclined ramp surfaces 43 and 44 are designed to give a constant torque regardless of the position of the cam follower 54 on the ramp surface, constant torque will be provided throughout the entire range of steering regardless of what the range is. If necessary, the steering motor can provide steering torque through the full 360°, however, in most aircraft installations this range will not be required. Because the steering motor can be turned through a full 360° the wheels 12 can be swiveled through a full 360° to facilitate the ground handling of the aircraft and it is not necessary to disconnect the steering motor as is the case in most previous steering systems.

Although a preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

We claim:

1. An aircraft steering mechanism comprising a pair of members capable of relative rotation, a cam fixed on one of said members provided with a first group of spaced ramp surfaces and a second group of spaced opposed ramp surfaces inclined in a manner whereby a linear force supplied successively to one group of surfaces causes rotation of said one member, a plurality of fluid motors mounted on the other of said members each including an element movable under the influence of pressure fluid, a source of pressure fluid connected to a first pressure line, a fluid reservoir connected to a second pressure line, a cam follower carried by each element engaging said cam adapted to exert said linear force by virtue of movement of said element, said cam and fluid motors being proportioned so that at least one cam follower always engages one of said first group of surfaces and at least another always engages one of said second group of surfaces, all of said ramp surfaces being formed so that the ratio between the magnitude of linear displacement of a cam follower engaging any ramp surface relative to the magnitude of the annular displacement of said cam is a constant, and control means operated by virtue of the rotation of said one member operably connected to said fluid motors to successively connect the fluid motor associated with the cam follower engaging one group of surfaces to said first pressure line as each surface of the group moves into the path of the followers and successively connects the fluid motor associated with the cam follower engaging the other group of surfaces to said second pressure line as each surface of such group moves into the path of each follower.

2. An aircraft steering mechanism comprising a pair of members capable of relative rotation, a cam fixed on one of said members provided with a plurality of spaced similar first ramp surfaces and second similar opposed ramp surfaces inclined in a manner whereby a linear force supplied successively to similar surfaces causes rotation of said one member, a plurality of fluid motors mounted on the other of said members each including an element movable in response to pressure fluid, first and second fluid pressure lines, a cam follower carried by each element adapted to exert said linear force on said surfaces by virtue of said movement of said element, said cam and fluid motors being proportioned so that at least one cam follower is always in engagement with one of said first surfaces and another always in engagement with one of said second surfaces, all of said ramp surfaces being formed so that the ratio between the magnitude of linear displacement of a cam follower engaging any ramp surface relative to the magnitude of the annular displacement of said cam is a constant, and distributor means operated by virtue of the rotation of said one member operably connected to said fluid motors to successively connect the fluid motor associated with the cam follower engaging said first surfaces to said first pressure line as said first surfaces move into the path of said followers and successively connect the fluid motor associated with the cam follower engaging said second surface to said second pressure line as said second surfaces move into the path of said followers.

3. In a device of the character described a pair of members capable of relative rotation, a cam fixed on one of said members provided with a plurality of spaced similar first ramp surfaces and second similar opposed ramp surfaces inclined in a manner whereby a linear force supplied successively to similar surfaces causes rotation of said one member, a plurality of fluid motors mounted on the other of said members each including an element movable in response to pressure fluid, first and second fluid pressure lines, a cam follower carried by each element adapted to exert said linear force on said surfaces by virtue of said movement of said element, said cam and fluid motors being proportioned so that at least one cam follower is always in engagement with one of said first surfaces and another always in engagement with one of said second surfaces, all of said ramp surfaces being formed so that the ratio between the magnitude of linear displacement of a cam follower engaging any ramp surface relative to the magnitude of the annular displacement of said cam is constant, distributor means operated by virtue of the rotation of said one member operably connected to said fluid motors to successively connect the fluid motor associated with the cam follower engaging said first surfaces to said first pressure line as said first surfaces move into the path of said followers and successively connect the fluid motor associated with the cam follower engaging said second surface to said second pressure line as said second surfaces move into the path of said followers, and means connecting said pressure lines together through flow restrictions whereby rotation of said cam is resisted.

4. An aircraft steering mechanism comprising a pair of members capable of relative rotation, a cam fixed on one of said members provided with a plurality of spaced similar first ramp surfaces and second similar opposed ramp surfaces inclined in a manner whereby a linear force supplied successively to similar surfaces causes rotation of said one member, a plurality of fluid motors mounted on the other of said members each including an element movable in response to pressure fluid, a source of pressure fluid, a fluid reservoir, first and second pressure lines, a control valve adapted to connect said first pressure line to said source and said second pressure line to said reservoir when said control valve is in one position and connect said first pressure line to said reservoir and said second pressure line to said source when said control valve is in another position, a cam follower carried by each element adapted to exert said linear force on said surface by virtue of said movement of said element, said cam and fluid motor being proportioned so that at least one cam follower is always in engagement with one of said first surfaces and another always in engagement with one of said second surfaces, all of said ramp surfaces being formed so that the ratio between the magnitude of linear displacement of a cam follower engaging any ramp surface relative to the magnitude of the annular displacement of said cam is a constant, and distributor means operated by virtue of the rotation of said one member operably connected to said fluid motors to successively connect the fluid motor associated with the cam follower engaging said first surfaces to said first pressure line as said first surfaces move into the path of said followers and successively connect the fluid motor associated with the cam follower engaging said second surfaces to said second pressure line as said second surfaces move into the path of said followers.

5. A steering mechanism comprising a fixed member, a rotatable member mounted for rotation relative to said fixed member, one of said members being formed with a cam having a plurality of lobes symetrically spaced around said one member each lobe providing inclined first group of ramp surfaces and inclined second group ramp surfaces opposed to said first group surface, whereby a linear force applied successively to one group produces relative rotation between said members, a plurality of cylinders mounted on the other of said members aligned with said ramps, a cooperating piston in each cylinder axially movable relative thereto toward said ramp surfaces in response to pressure fluid, a cam follower on each piston engaging said cam adapted to exert said linear force by virtue of said piston movement with at least one cam follower always in engagement with one of said first group of ramp surfaces, all of said ramp surfaces being formed so that the ratio between the magnitude of linear displacement of a cam follower engaging any ramp surface relative to the magnitude of the annular displacement of said cam is a constant, and at least another of said followers in enaggement with one of said second group ramp surfaces, and means operably connected to said cylinders to successively supply pressure fluid to the cylinder associated with the cam follower engaging said first ramp surfaces as they move into the path of said followers for producing relative rotation between said members in one direction and to successively supply pressure fluid to the cylinder associated with the cam follower engaging said second ramp surfaces as they move into the path of said followers for producing relative rotation between said members in the other direction.

6. A steering mechanism comprising a fixed member, a rotaatble member mounted for rotation relative to said fixed member, one of said members being formed with a cam having a plurality of lobes each providing similar inclined first ramp surfaces and similar inclined second ramp surfaces opposed to said first surface, whereby a linear force applied successively to similar surfaces produces relative rotation between said members, a plurality of cylinders mounted on the other of said members aligned with said ramps, a cooperating piston in each cylinder axially movable relative thereto toward said ramp surfaces in response to pressure fluid, a cam follower on each piston engaging said cam adapted to exert said linear force by virtue of said piston movement with at least one cam follower always in engagement with one of said first ramp surfaces and at least another of said followers in engagement with one of said second ramp surfaces, all of said ramp surfaces being formed so that the ratio between the magnitude of linear displacement of a cam follower engaging any ramp surface relative to the magnitude of the annular displacement of said cam is a constant, and means operably connected to said cylinders to successively supply pressure fluid to the cylinder associated with the cam follower engaging said first ramp surfaces as the surfaces move into the path of said followers for producing relative rotation between said members in one direction and to successivly supply pressure fluid to the cylinder associated with the cam follower engaging said second ramp surfaces as such surfaces move into the path of said followers for producing relative rotation between said members in the other direction.

References Cited in the file of this patent
UNITED STATES PATENTS

| | | |
|---|---|---|
| 1,228,502 | Vance | June 5, 1917 |
| 2,423,701 | Hardy | July 8, 1947 |
| 2,424,233 | Greenough | July 22, 1947 |
| 2,545,774 | Griswold | Mar. 20, 1951 |
| 2,621,002 | Pittman | Dec. 9, 1952 |
| 2,712,422 | Gerwig | July 5, 1955 |
| 2,759,687 | Hogan | Aug. 21, 1956 |

FOREIGN PATENTS

| | | |
|---|---|---|
| 2,625 | Great Britain | May 25, 1910 |